US010675548B1

(12) United States Patent
Colton

(10) Patent No.: US 10,675,548 B1
(45) Date of Patent: Jun. 9, 2020

(54) CHILD CAR SEAT

(71) Applicant: Christy Colton, San Diego, CA (US)

(72) Inventor: Christy Colton, San Diego, CA (US)

( * ) Notice: Subject to any disclaimer, the term of this patent is extended or adjusted under 35 U.S.C. 154(b) by 0 days.

(21) Appl. No.: 16/208,738

(22) Filed: Dec. 4, 2018

(51) Int. Cl.
*A47C 1/08* (2006.01)
*A63G 31/16* (2006.01)
*A47D 13/10* (2006.01)
*B60N 2/28* (2006.01)

(52) U.S. Cl.
CPC ............. *A63G 31/16* (2013.01); *A47D 13/10* (2013.01); *B60N 2/2845* (2013.01)

(58) Field of Classification Search
CPC ...... B60N 2/28; B60N 2/2812; B60N 2/2839; B60N 2/2821; B60N 2002/0264; B60N 2/5678; B60N 2/2845; B60N 2002/0272; B60N 2002/0268; B60N 2/002
USPC ..... 297/256.16, 256.12, 260.2, 250.1, 217.3, 297/217.4, 217.6, 217.1
See application file for complete search history.

(56) References Cited

U.S. PATENT DOCUMENTS

| D321,449 | S | 11/1991 | Meeker | |
|---|---|---|---|---|
| 5,588,164 | A | 12/1996 | Proulx | |
| 5,624,156 | A * | 4/1997 | Leal | A47C 7/72 |
| | | | | 297/217.4 |
| 7,036,880 | B1 | 5/2006 | Goodman | |
| 7,039,207 | B1 | 5/2006 | Elrod | |
| 7,463,161 | B2 * | 12/2008 | Griffin | B60N 2/002 |
| | | | | 180/271 |
| 7,466,221 | B1 * | 12/2008 | Lehr | B60N 2/2812 |
| | | | | 340/457.1 |
| 7,485,086 | B2 | 2/2009 | Dickie | |
| 7,669,927 | B1 | 3/2010 | Zaid | |
| 7,703,848 | B1 | 4/2010 | Cochran | |
| 8,007,043 | B1 * | 8/2011 | Vuong | B60N 2/28 |
| | | | | 297/217.3 |
| 8,047,888 | B1 | 11/2011 | Seymore | |
| 8,197,005 | B2 * | 6/2012 | Hopke | A47D 9/02 |
| | | | | 297/344.17 |
| 10,470,585 | B2 * | 11/2019 | Robbins | A47D 9/02 |
| 10,479,235 | B1 * | 11/2019 | Stroud | B60N 2/976 |
| 2005/0275260 | A1 * | 12/2005 | Patterson | B60N 2/002 |
| | | | | 297/256.16 |
| 2007/0296254 | A1 * | 12/2007 | Kahn | B60N 2/2821 |
| | | | | 297/256.16 |
| 2011/0006569 | A1 * | 1/2011 | Davies | B60N 2/26 |
| | | | | 297/217.4 |

(Continued)

FOREIGN PATENT DOCUMENTS

WO 2009094013 10/2009

*Primary Examiner* — Chi Q Nguyen

(57) ABSTRACT

The child car seat simulates the motions and sounds of a car seat being driven over a road in order to comfort and soothe an infant and to induce the infant to sleep. An infant may be placed on padding attached to the top interior of the seat body and restrained by a left blanket half and a right blanket half. A motion mechanism located in the base of the seat body may cause movement of the child care seat that resembles the movement that a car seat would experience in a moving vehicle. One or more speakers located within the shell of the seat body may play an audio program to simulate vehicular and traffic noises. The intensity and type of movement and the volume and specific audio program may be selected from controls located on the upper rear of the seat body.

17 Claims, 6 Drawing Sheets

(56) References Cited

U.S. PATENT DOCUMENTS

2014/0265480 A1\* 9/2014 Perrin .................... B60N 2/26
297/217.4

\* cited by examiner

CHILD CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of infant accessories, more specifically, a child car seat simulator.

SUMMARY OF INVENTION

The child car seat simulates the motions and sounds of a car seat being driven over a road in order to comfort and soothe an infant and to induce the infant to sleep. An infant may be placed on padding attached to the top interior of the seat body and restrained by a left blanket half and a right blanket half. A motion mechanism located in the base of the seat body may cause movement of the child care seat that resembles the movement that a car seat would experience in a moving vehicle. One or more speakers located within the shell of the seat body may play an audio program to simulate vehicular and traffic noises. The intensity and type of movement and the volume and specific audio program may be selected from controls located on the upper rear of the seat body.

An object of the invention is to restrain and comfort an infant

Another object of the invention is to simulate movements of a car seat being driven on a road.

A further object of the invention is to simulate sounds suggestive of a vehicular road trip.

Yet another object of the invention is to select the movements and sounds from controls located on the seat body.

These together with additional objects, features and advantages of the child car seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the child car seat in detail, it is to be understood that the child car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child car seat.

It is therefore important that the claims be regarded as including such equivalent construction insofar as they do not depart from the spirit and scope of the child car seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
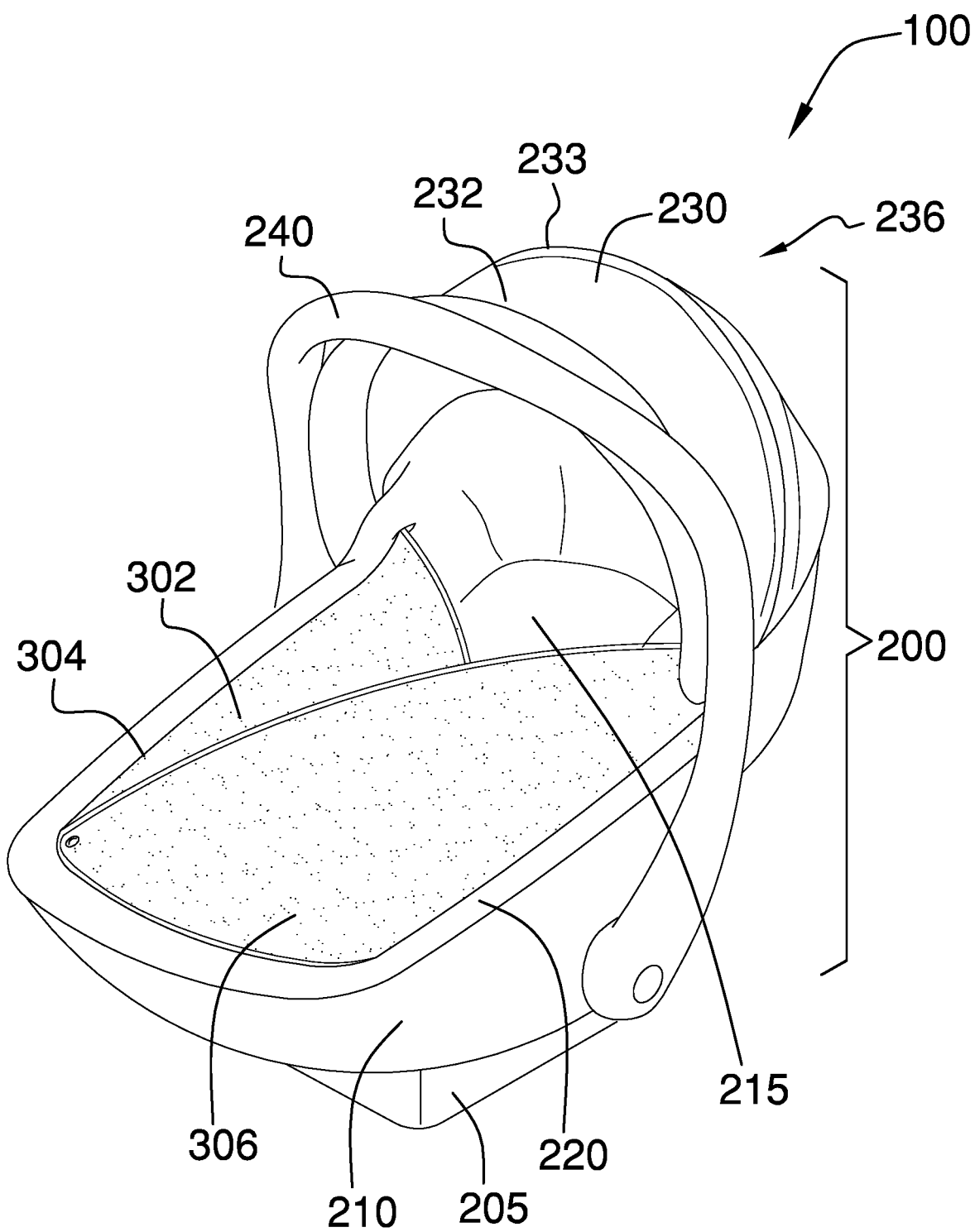
FIG. 1 is a perspective view of an embodiment of the disclosure.
Figure 2:
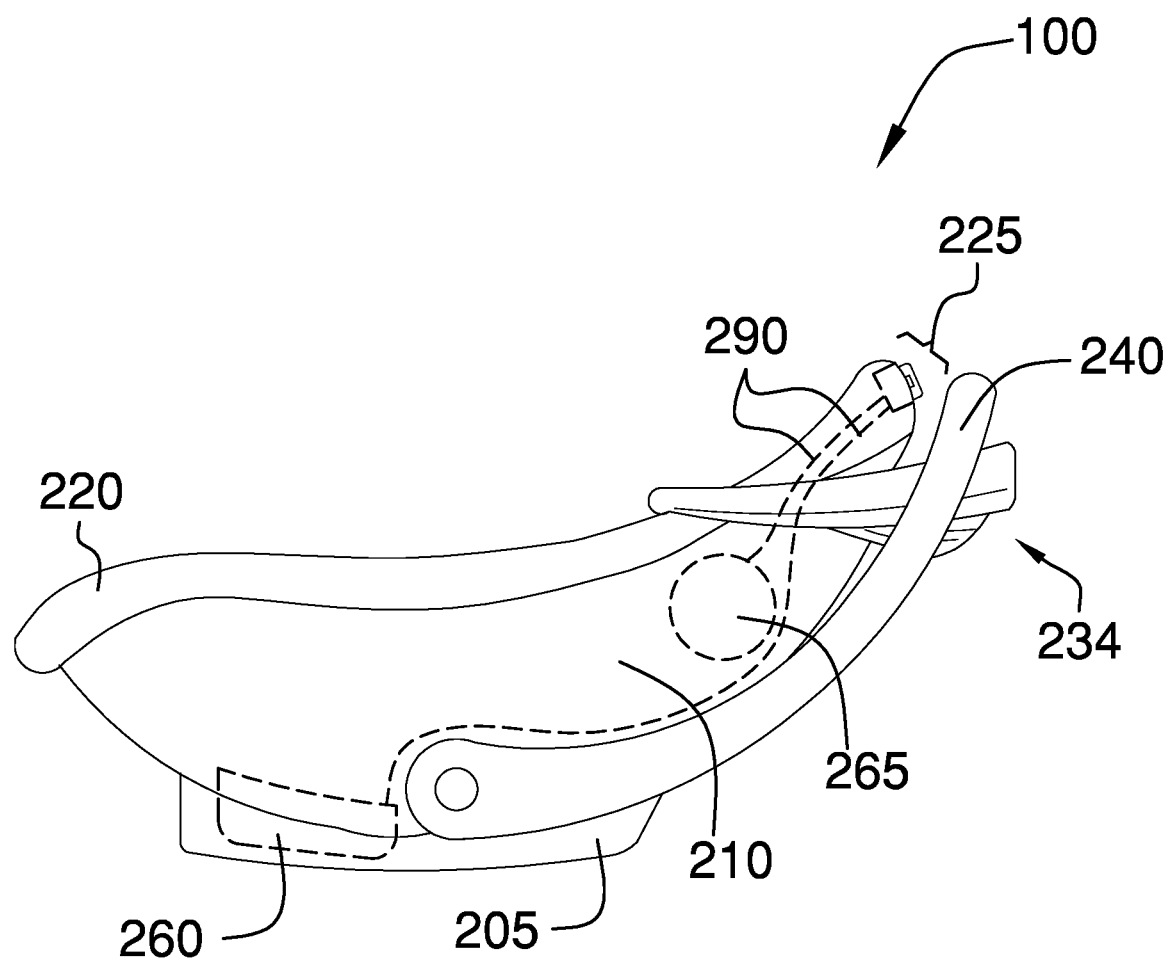
FIG. 2 is a side view of an embodiment of the disclosure.
Figure 3:
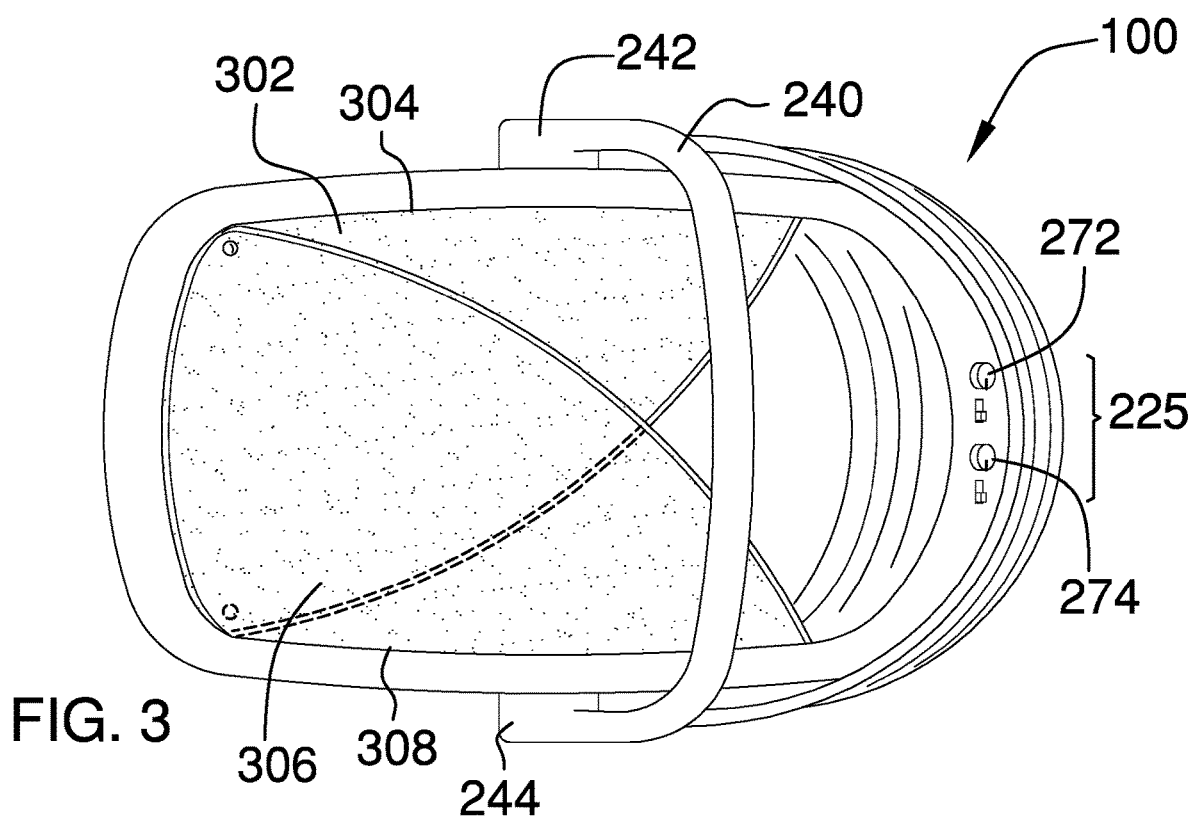
FIG. 3 is a top view of an embodiment of the disclosure.
Figure 4:
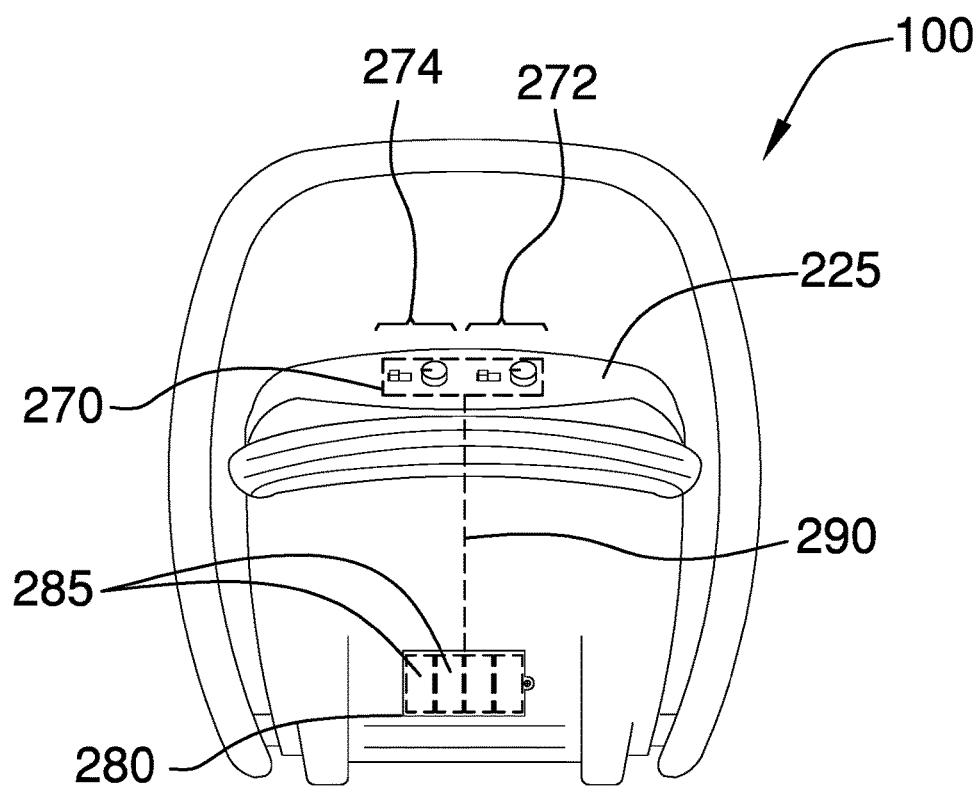
FIG. 4 is a rear view of an embodiment of the disclosure
Figure 5:
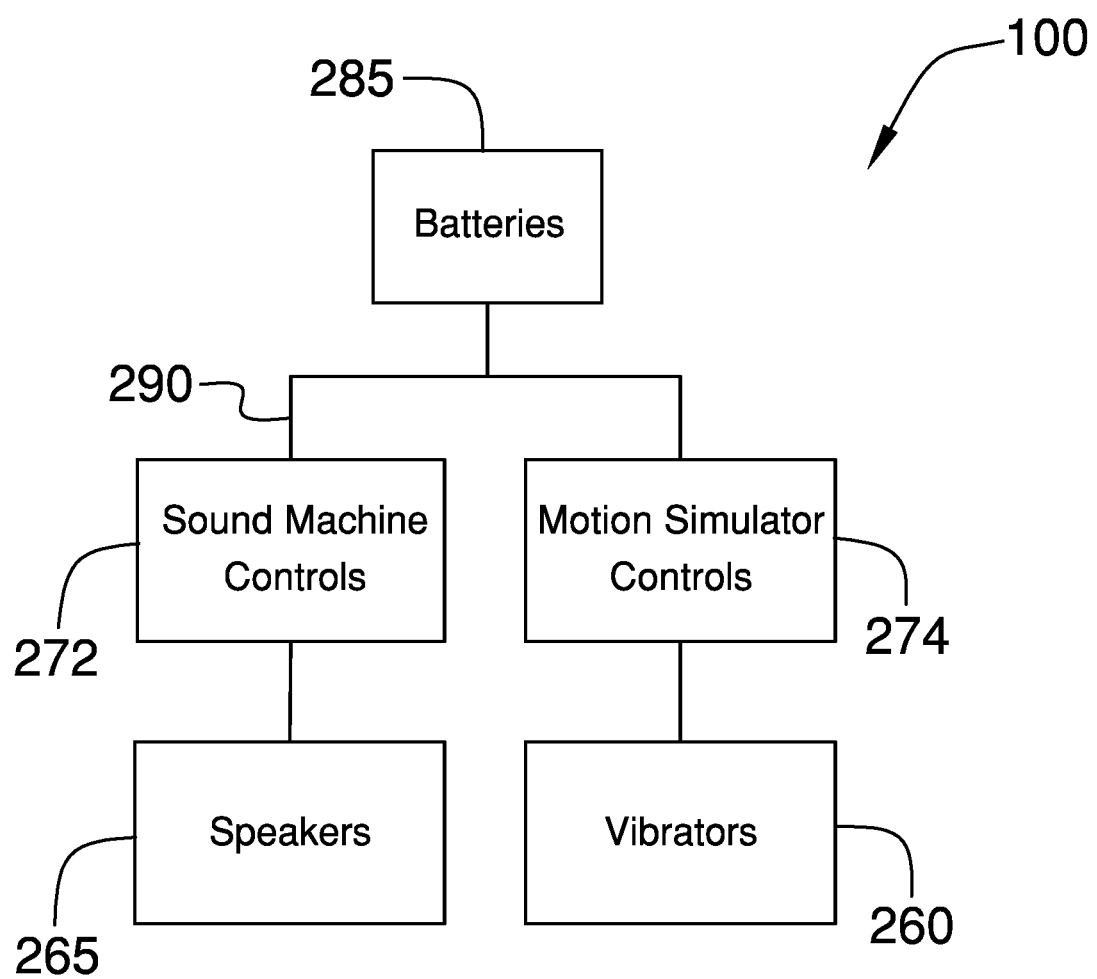
FIG. 5 is a block diagram of an embodiment of the disclosure illustrating the interconnections of the motion subsystem and the sound system.
Figure 6:
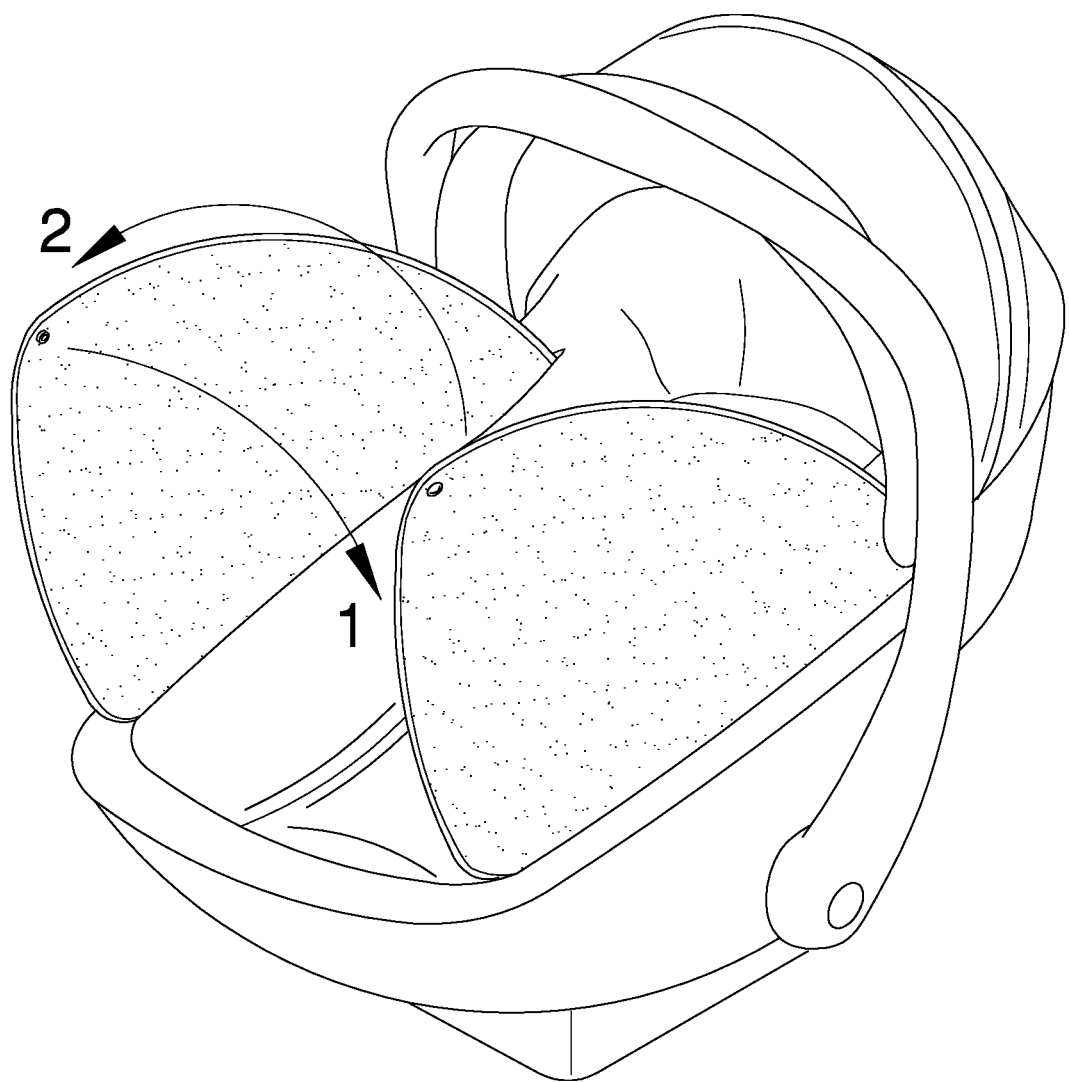
FIG. 6 is a detail view of an embodiment of the disclosure illustrating the sequencing of the left and right blanket halves for infant restraint.
Figure 7:
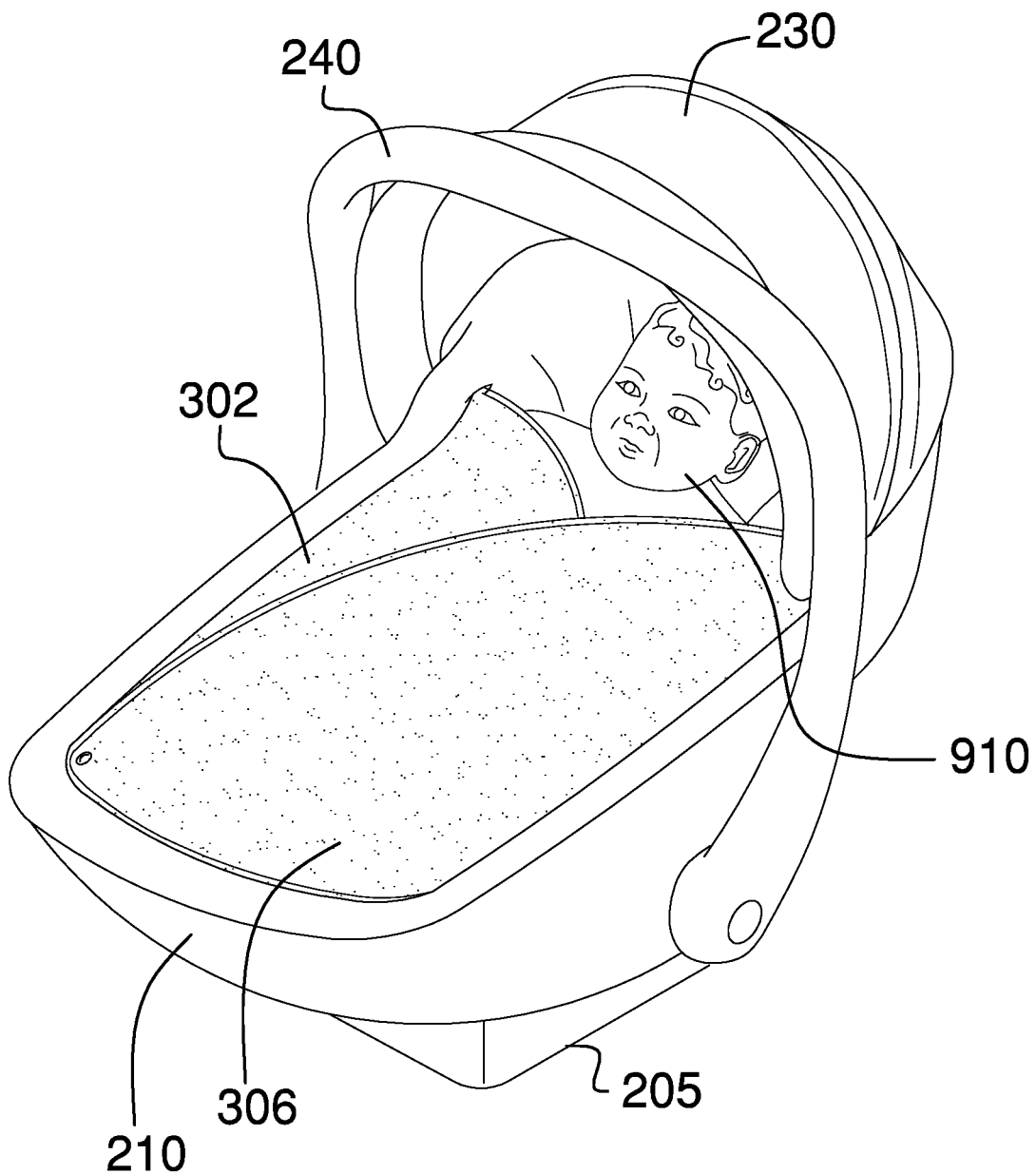
FIG. 7 is an in-use view of an embodiment of the disclosure.

Detailed reference will now be made to a first potential embodiment of the disclosure, which is illustrated in FIGS. 1 through 7.

The child car seat 100 (hereinafter invention) comprises a seat body 200, a motion mechanism 260, one or more speakers 265, a controller 270, one or more sound controls 272, and one or more motion controls 274. The invention 100 may be adapted to simulate the motions and sounds of a car seat being driven over a road in order to comfort and soothe an infant 910 and to induce the infant 910 to sleep.

The seat body 200 may comprise a shell 210 and a base 205. The seat body 200 may enclose electronic and electro-mechanical components and may be adapted to provide a seating/reclining area for the infant 910. The shell 210 may comprise padding 215 and an operator control panel 225. The shell 210 may be a semi-ovate enclosure that is adapted to hold the infant 910. The shell 210 may be concave when viewed from above. The bottom of the shell 210 may be coupled to the base 205.

The padding 215 may be located within the hollow top of the shell 210 and may line the interior sides of the shell 210. The padding 215 may be adapted to provide comfort for the infant 910 by cushioning the infant 910 from the walls of the shell 210. The padding 215 may cover the interior of the shell 210. In some embodiments, the padding 215 may be detachable and removable for laundering.

An upper rim 220 around the top of the shell 210 may widen at the rear of the shell 210 to form the operator control panel 225. The one or more sound controls 272 and/or the one or more motion controls 274 may be mounted on the operator control panel 225.

The base 205 may be a support structure located on the underside of the shell 210. The base 205 may rest upon a crib or other horizontal surface. The base 205 may elevate the shell 210 above the crib or other horizontal surface. The base 205 may house the motion mechanism 260 and a plurality of batteries 285.

The motion mechanism 260 may produce a movement of the seat body 200 when the motion mechanism 260 is energized. As non-limiting examples, the movement may be vibration, longitudinal rocking, lateral rocking, or a combination thereof. The motion mechanism 260 may utilize one or more eccentric rotating masses or other electromechanical actuators to produce the movement. The energization of the motion mechanism 260 and the mode of operation may be determine by the controller 270 and communicated to the motion mechanism 260 over wiring 290. The movement produced by the motion mechanism 260 may be rhythmic, random, or a combination thereof. In some embodiments, the movement may simulate the motions of automobile driving on the road.

The one or more speakers 265 may be adapted to be located within the shell 210 such that the one or more speakers 265 may be heard by the infant 910. The one or more speakers 265 may play an audio program provided by the controller 270 over the wiring 290. As non-limiting examples, the audio program may be pre-recorded sounds, synthesized sounds, or a combination thereof. In some embodiments, the audio program may simulate the sounds of automobile driving on the road.

The controller 270 may control the operation of the motion mechanism 260 and the one or more speakers 265. Specifically, the controller 270 may read the positions of the one or more sound controls 272 and the one or more motion controls 274 and responsive to the positions of the one or more sound controls 272 and the one or more motion controls 274 the controller 270 may determine a pattern and intensity for operating the motion mechanism 260 and a volume and the audio program to play through the one or more speakers 265.

The invention 100 may comprise the plurality of batteries 285. The plurality of batteries 285 may reside within a battery compartment 280 that is located in the base 205 and/or the shell 210. The plurality of batteries 285 may comprise one or more energy-storage devices. The plurality of batteries 285 may be a source of electrical energy to operate the motion mechanism 260, the controller 270, and the one or more speakers 265. The plurality of batteries 285 may be replaceable or rechargeable. The plurality of batteries 285 may be electrically connected to the controller 270 via the wiring 290.

A swaddling blanket may comprise a left swaddling blanket half 302 and a right swaddling blanket half 306. The swaddling blanket may hold the infant 910 in a supine position and may comfort the infant 910. The left swaddling blanket half 302 may attach to the left side of the padding 215 or the shell 210 via a left swaddling blanket coupling 304. The right swaddling blanket half 306 may attach to the right side of the padding 215 or the shell 210 via a right swaddling blanket coupling 308. The left swaddling blanket half 302 and the right swaddling blanket half 306 may be adapted to be individually pulled across the infant 910 and fastened on the opposing side of the shell 210. In some embodiments, the left swaddling blanket coupling 304 and the right swaddling blanket coupling 308 may be detachable so that the left swaddling blanket half 302 and the right swaddling blanket half 306 may be removed from the invention 100 for laundering.

The invention 100 may be carried using a handle 240. The handle 240 may be pivotably coupled to the outside of the shell 210 on the left side of the shell 210 via a left handle pivot 242. The handle 240 may be pivotably coupled to the outside of the shell 210 on the right side of the shell 210 via a right handle pivot 244. The handle 240 may be rotated to a vertical position for carrying the invention 100 or to a horizontal position when not in use. The left handle pivot 242 and the right handle pivot 244 may comprise a position lock to hold their set position until released by deactivating the locking mechanism. As a non-limiting example, the position lock may be a friction brake that is released by pressing a button centrally located on the left handle pivot 242 and the right handle pivot 244.

A canopy 230 may be a collapsible shield that partially covers the shell 210 when in a canopy deployed position 236. The canopy 230 may comprise a flexible cover 232 held in place by a plurality of curved ribs 233. The plurality of curved ribs 233 may pivot at points at the top of each side of the shell 210. In a canopy stowed position 234, the canopy 230 may be pivoted to a horizontal orientation where it is out of the way. In the canopy deployed position 236, the plurality of curved ribs 233 may be pivoted to a plurality of angular position between horizontal and vertical such that the flexible cover 232 is stretched between a vertically-oriented rib and a horizontally-oriented rib.

In use, the invention 100 may be placed in the crib and the infant 910 may be placed onto the padding 215 with the infant 910 in a supine position. The left swaddling blanket half 302 and the right swaddling blanket half 306 may be pulled across the infant 910 and fastened into place to restrain and comfort the infant 910. The one or more motion controls 274 and the one or more sound controls 272 may be adjusted to produce the movement and the audio program that simulate a drive in a vehicle. As the infant 910 falls asleep, the one or more motion controls 274 may be adjusted to reduce the intensity of the movement and the one or more sound controls 272 may be adjusted to reduce the volume of the audio program.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "brake" is a device that is used to slow or stop the motion of a machine or a vehicle.

As used in this disclosure, a "canopy" is a cover, usually made of fabric that is placed above an area and creates a protected area within which people or objects are protected from the environment.

As used in this disclosure, "concave" is used to describe a surface that resembles the interior surface of a sphere or a portion thereof.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "drive" is a mechanism or device that turns linear motion in to rotational motion or rotational motion into linear motion.

As used in this disclosure, a "drive" is a mechanism or a device that transmits a motive force from a first device or object to a second device or object with the objective or operating the second object.

As used herein, "energize" and/or "energization" refer to the application of an electrical potential to a system or subsystem.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, "rocking" refers to a repetitive motion back and forth around a horizontal axis of rotation.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used in this disclosure, a "lock" is a device that prevents the movement or operation of another device.

As used herein, the word "longitudinal" or "longitudinally" refers to a lengthwise or longest direction.

As used in this disclosure, "orientation" refers to the positioning and/or angular alignment of a first object relative to a second object or relative to a reference position or reference direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used herein, "prone" refers to a horizontal position where the dorsal side is up and the ventral side is down and "supine" refers to a horizontal position where the dorsal side is down and the ventral side is up. As non-limiting examples, a person lying on their stomach is in a prone position and a person lying on their back is in a supine position.

As used herein, "random" may refer to an outcome which cannot be predicted in advance or to a sequence that lacks a definite pattern. Unless stated otherwise, random includes both truly random and pseudorandom outcomes and sequences. Pseudorandom may refer to an outcome or sequence that is selected by a definite computational process but that satisfies one or more standard tests for statistical randomness.

As used in this disclosure, a "rim" is an outer edge or border that follows along the perimeter of an object.

As used in this disclosure, a "shell" is a structure that forms an outer covering intended to contain an object. Shells are often, but not necessarily always, rigid or semi-rigid structures that are intended to protect the object contained within it. Some shells may only partially cover the exterior surface of the object.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present The inventor claims:

1. A child car seat comprising:
   a seat body, a motion mechanism, one or more speakers, a controller, one or more sound controls, and one or more motion controls;
   wherein the child car seat is adapted to simulate a motion and sound of a car seat being driven over a road in order to comfort and soothe an infant and to induce the infant to sleep;
   wherein the motion mechanism produces a movement of the seat body when the motion mechanism is energized;
   wherein the movement is vibration, longitudinal rocking, lateral rocking, or a combination thereof;
   wherein the energization of the motion mechanism and a mode of operation are determine by a controller and communicated to the motion mechanism over wiring;
   wherein the movement produced by the motion mechanism is rhythmic, random, or a combination thereof.

2. The child car seat according to claim 1
   wherein the seat body comprises a shell and a base;
   wherein the seat body encloses electronic and electromechanical components and is adapted to provide a seating or reclining area for the infant the shell comprises padding and an operator control panel;
   wherein the shell is a semi-ovate enclosure that is adapted to hold the infant;
   wherein the shell is concave when viewed from above;
   wherein a bottom of the shell is coupled to the base.

3. The child car seat according to claim 2
   wherein the padding is located within a hollow top of the shell and lines an interior sides of the shell;
   wherein the padding is adapted to provide comfort for the infant by cushioning the infant from a walls of the shell;
   wherein the padding covers the interior of the shell.

4. The child car seat according to claim 3
   wherein the padding is detachable and removable for laundering.

5. The child car seat according to claim 3
   wherein an upper rim around a top of the shell widens at the rear of the shell to form the operator control panel;
   wherein the one or more sound controls and/or the one or more motion controls are mounted on the operator control panel.

6. The child car seat according to claim 5
   wherein the base is a support structure located on an underside of the shell;
   wherein the base elevates the shell above a crib or other horizontal surface;
   wherein the base houses the motion mechanism and a plurality of batteries.

7. The child car seat according to claim 6
   wherein the movement simulates the motions of automobile driving on the road.

8. The child car seat according to claim 6
   wherein the one or more speakers are adapted to be located within the shell such that the one or more speakers are heard by the infant;
   wherein the one or more speakers play an audio program provided by the controller over the wiring.

9. The child car seat according to claim 8
   wherein the audio program comprises pre-recorded sounds, synthesized sounds, or a combination thereof.

10. The child car seat according to claim 9
    wherein the audio program simulates the sounds of automobile driving on the road.

11. The child car seat according to claim 9
    wherein the controller controls an operation of the motion mechanism and the one or more speakers;
    wherein the controller reads a positions of the one or more sound controls and the one or more motion controls and responsive to the positions of the one or more sound controls and the one or more motion controls the controller determines a pattern and intensity for operating the motion mechanism and a volume and the audio program to play through the one or more speakers.

12. The child car seat according to claim 11
    wherein the child car seat comprises the plurality of batteries;
    wherein the plurality of batteries resides within a battery compartment that is located in the base and/or the shell;
    wherein the plurality of batteries comprises one or more energy-storage devices;
    wherein the plurality of batteries are a source of electrical energy to operate the motion mechanism, the controller, and the one or more speakers;
    wherein the plurality of batteries are replaceable or rechargeable;
    wherein the plurality of batteries are electrically connected to the controller via the wiring.

13. The child car seat according to claim 12
    wherein a swaddling blanket comprises a left swaddling blanket half and a right swaddling blanket half;
    wherein the swaddling blanket holds the infant in a supine position and comforts the infant.

14. The child car seat according to claim 13
    wherein the left swaddling blanket half attaches to the left side of the padding or the shell via a left swaddling blanket coupling;
    wherein the right swaddling blanket half attaches to the right side of the padding or the shell via a right swaddling blanket coupling;
    wherein the left swaddling blanket half and the right swaddling blanket half are adapted to be individually pulled across the infant and fastened on the opposing side of the shell.

15. The child car seat according to claim 14
    wherein the left swaddling blanket coupling and the right swaddling blanket coupling are detachable so that the left swaddling blanket half and the right swaddling blanket half are removed from the child car seat for laundering.

16. The child car seat according to claim 14
    wherein the child car seat is carried using a handle;
    wherein the handle is pivotably coupled to the outside of the shell on the left side of the shell via a left handle pivot;
    wherein the handle is pivotably coupled to the outside of the shell on the right side of the shell via a right handle pivot;
    wherein the handle is rotated to a vertical position for carrying the child car seat or to a horizontal position when not in use.

17. The child car seat according to claim 16
    wherein a canopy is a collapsible shield that partially covers the shell when in a canopy deployed position;
    wherein the canopy comprises a flexible cover held in place by a plurality of curved ribs;
    wherein the plurality of curved ribs pivot at points at the top of each side of the shell;

wherein in a canopy stowed position, the canopy is pivoted to a horizontal orientation where the canopy is out of the way;

wherein in the canopy deployed position, the plurality of curved ribs is pivoted to a plurality of angular position between horizontal and vertical such that the flexible cover is stretched between a vertically-oriented rib and a horizontally-oriented rib.

* * * * *